United States Patent [19]
Borling et al.

[11] Patent Number: 5,799,475
[45] Date of Patent: Sep. 1, 1998

[54] REAR SUSPENSION FOR RIDING MOWER

[75] Inventors: Al Borling, Valley City; Axel Schaedler, N. Royalton, both of Ohio

[73] Assignee: MTD Products Inc., Cleveland, Ohio

[21] Appl. No.: 709,461

[22] Filed: Sep. 5, 1996

[51] Int. Cl.$^6$ .................................................. A01D 34/64
[52] U.S. Cl. ................ 56/14.7; 56/DIG. 3; 56/DIG. 10; 56/DIG. 22; 280/788
[58] Field of Search ..................... 56/14.7, 10.1, 56/1, DIG. 3, DIG. 10, DIG. 22; 280/788, 781

[56] References Cited

U.S. PATENT DOCUMENTS

| | | | |
|---|---|---|---|
| 3,917,306 | 11/1975 | Madler et al. | 280/788 X |
| 5,138,825 | 8/1992 | Trefz et al. | 56/11.1 |
| 5,163,274 | 11/1992 | Burdsall et al. | 56/DIG. 22 X |
| 5,218,814 | 6/1993 | Teal et al. | 56/14.7 |
| 5,367,864 | 11/1994 | Ogasawara et al. | 56/15.8 |
| 5,381,648 | 1/1995 | Seegert et al. | 56/17.1 |
| 5,433,066 | 7/1995 | Wenzel et al. | 56/14.7 |

*Primary Examiner*—Terry Lee Melius

[57] ABSTRACT

A riding mower is provided with a first frame element pivotably connected near a forward end to a second frame element and connected at a rearward end to the second frame element by spring means. The connecting members provide a suspension system for the mower in order to decouple the vertical movement of the first frame element from the second frame element and thereby soften the ride. A pivot bar located near the forward end of the first frame element is pivotably received at its ends near opposite side walls of the second frame element. The suspension system includes two springs which operate in the vertical gap between first and second frame elements at the rear of the apparatus.

22 Claims, 13 Drawing Sheets

REAR SUSPENSION FOR RIDING MOWER

BACKGROUND OF THE INVENTION

1. Field of Invention

This invention pertains to the art of methods and apparatuses for grass cutting lawn tractors, and more specifically to methods and apparatuses for improving the ride of lawn tractors through a suspension system therefor.

2. Description of the Related Art

Riding vehicles for cutting grass are known in the art. Generally such vehicles include at least one blade which rotates in a plane parallel and close to a ground surface. The operator's seat occupied by the lawn tractor operator is generally vertically spaced from the rotating blade. The body of the vehicle rides on three or four wheels across terrain which is often uneven and rough. The ride of the common lawn tractor generally transfers the roughness of the terrain directly to the operator during a mowing operation. The present invention contemplates a lawn cutting vehicle having a suspension system in order to better isolate the operator from such roughness and generally provide better and more advantageous overall results.

SUMMARY OF THE INVENTION

The present invention is directed to a grass cutting vehicle adapted to carry an operator, and more specifically to a vehicle having a suspension system to soften the ride of the vehicle.

According to one aspect of the present invention, a apparatus having a body mounted on front wheels and rear wheels and having a blade guard circularly disposed around a cutting blade acting in a generally horizontal plane is provided. The apparatus further includes an operator's seat, steering means, and blade height adjustment means. The apparatus includes a first frame element generally positioned to the rear of the apparatus and supporting the engine, battery, and fuel tank; a second frame element supporting the operator's seat; and, connecting means for connecting the first frame member to the second frame member in moveable relationship thereto.

According to another aspect of the invention, the connection means includes first spring means disposed between the first frame element and the second frame element near the rear wheels.

According to another aspect of the invention, the connection means further includes a pivot bar supported along a portion of its length by the first frame member and being pivotally received at each end near opposite sides of the second frame member.

According to another aspect of the invention, each of the front wheels is independently mounted to an undersurface of the second frame member in moveable relationship thereto.

One advantage of the present invention is the decoupled movement of the first frame element with respect to the second frame element which provides a softer ride for an operator of the apparatus.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

PREFERRED EMBODIMENT SECTION

Figure 8:
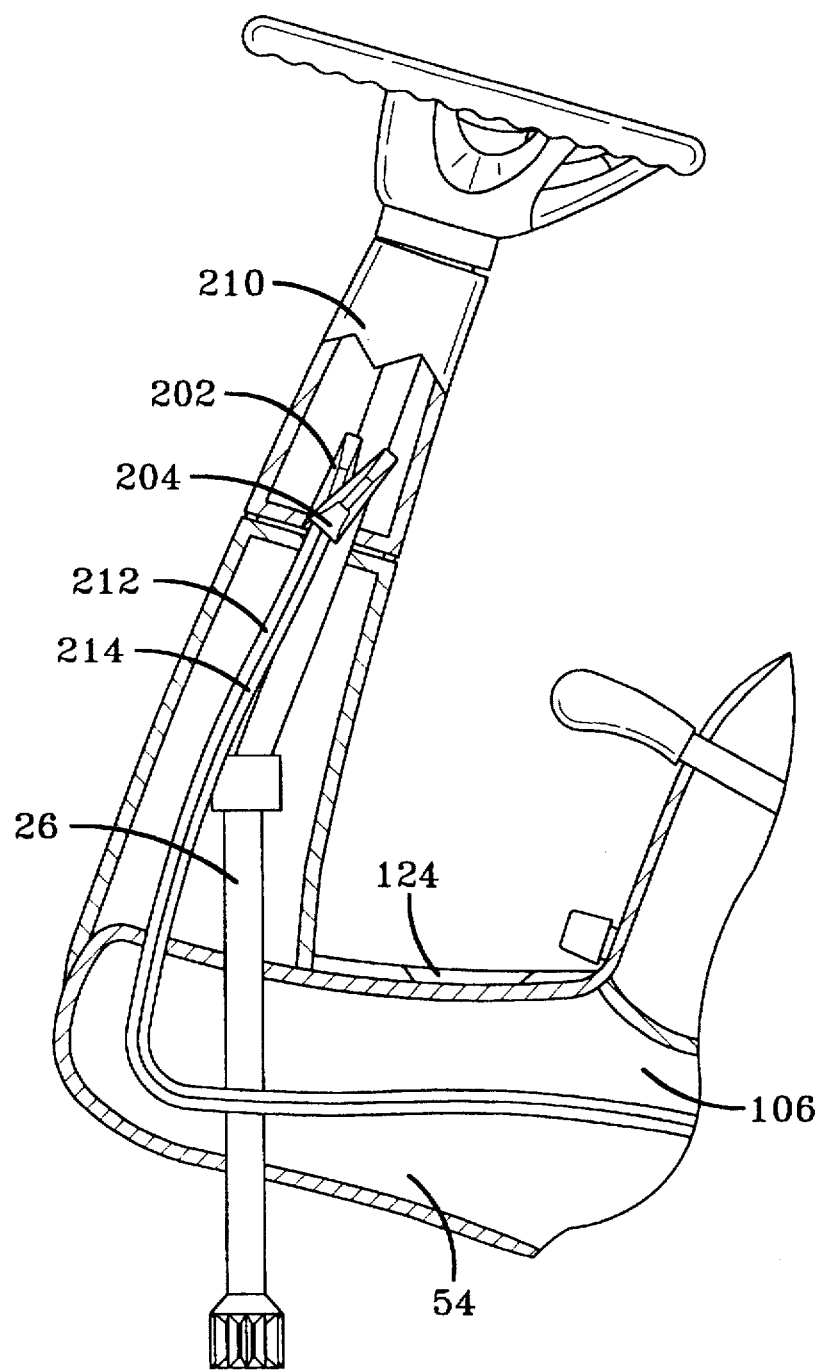
FIG. 8 is an exploded view, partly in section, showing a column of a vehicle according to the invention.

As shown in FIG. 8, column 210 is essentially hollow and partially houses steering means 26. Cables 212, 214 extend from shift levers 202, 204 down through column 210 and beneath front platform 124. Cables 212, 214 are supported against a side wall 106 of second frame element 54 along a portion of their length as they extend from forward portion 110 toward rearward portion 96 of apparatus 10.

FIGS. 9–14 are directed to various members of the apparatus 10.

DESCRIPTION OF THE PREFERRED EMBODIMENT

Figure 1:
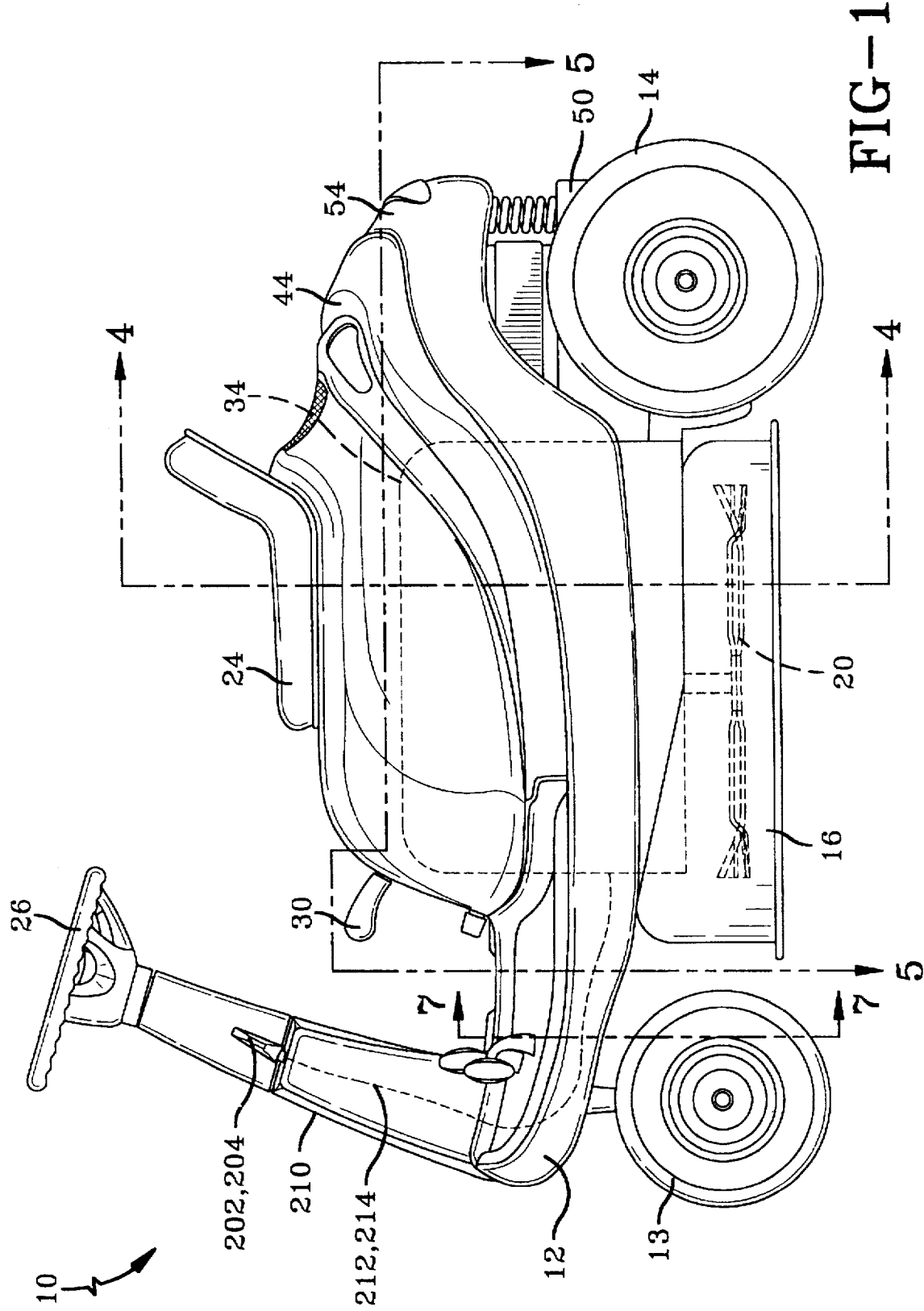
FIG. 1 is a right side view of a grass cutting apparatus according to the present invention.

Referring now to the drawings wherein the showings are for purposes of illustrating a preferred embodiment of the invention only and not for purposes of limiting the same, FIG. 1 is directed to a right side view of a grass cutting apparatus 10. The apparatus 10 includes a body 12 mounted on front wheels 13 and rear wheels 14 and having a blade guard 16 circularly disposed around a cutting blade 20 which acts in a generally horizontal plane. The apparatus 10 is of the riding mower type having an operator's seat 24, steering means 26, and blade height adjustment means 30. Grass clippings generated by the blade 20 can be transported by the air flow generated by the rotating blade 20 to collection means 34 where the clippings are collected and temporarily stored for later removal and disposal.

In one embodiment of the invention, collection means 34 is enclosed by hinged hood 44 to which operator's seat 24 is attached. Collection means 34 is not a part of the present invention and is therefore not shown in subsequent figures.

A unique aspect of the present invention concerns the body 12 which is generally formed of first frame element 50 and second frame element 54. As is evident in FIG. 1, the rear wheels 14 are mounted to first frame element 50 while the hinged hood 44 and therefore operator's seat 24 is supported by second frame element 54. In the present invention, the vertical movement of second frame element 54 is generally decoupled from the vertical movement of the first frame element 50 by the provision of a suspension system (not shown) as will be discussed later in this specification. The suspension system includes those elements which serve to connect second frame element 54 to first frame element 50 and generally works to stabilize the second frame element 54, and thereby an operator sitting on the operator's seat 24, upon movement of the apparatus 10 over rough terrain.

Figure 2:
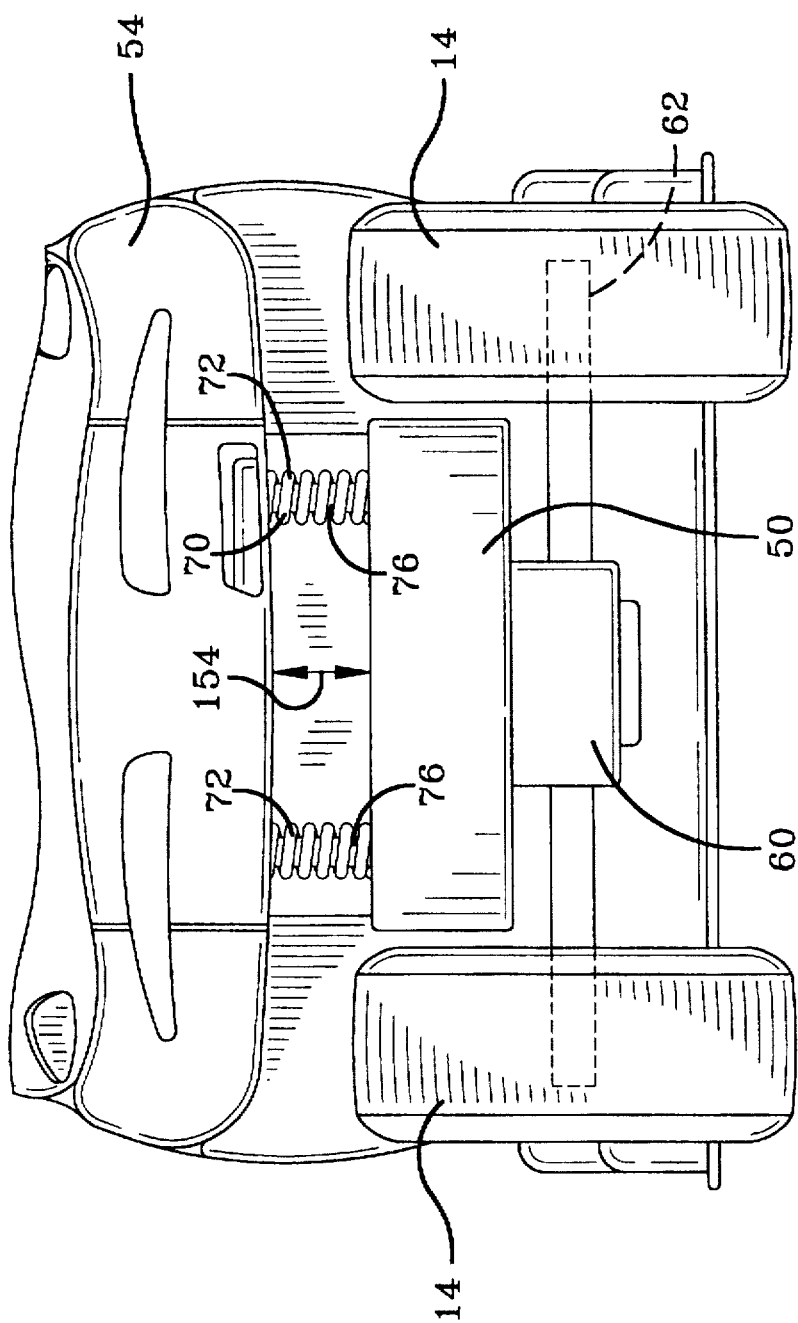
FIG. 2 is a partial back view of a apparatus according to the invention.

As shown in FIG. 2, rear mounting means 60 mount rear wheels 14 to first frame element 50 in fixed relationship. In a preferred embodiment, the rear wheels 14 are mounted at opposite ends of a single axle 62.

The suspension system of the apparatus 10 of the present invention includes first spring means 70 disposed between first frame element 50 and second frame element 54 near rear wheels 14. In a preferred embodiment, two vertical springs 72 are employed, each spring 72 being disposed about a guide rod 76.

Figure 3:
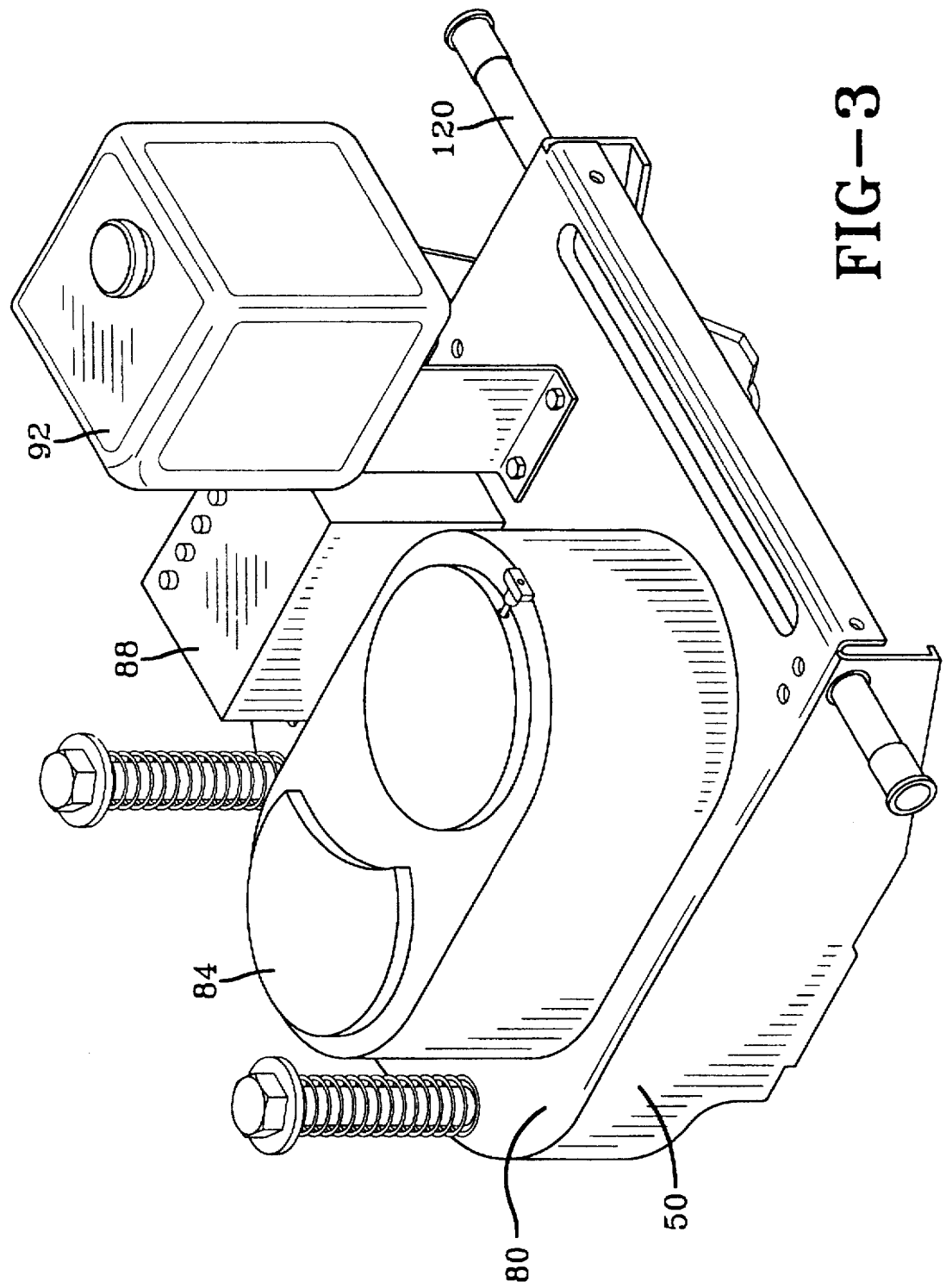
FIG. 3 is a perspective view showing first frame element according to the invention.
Figure 4:
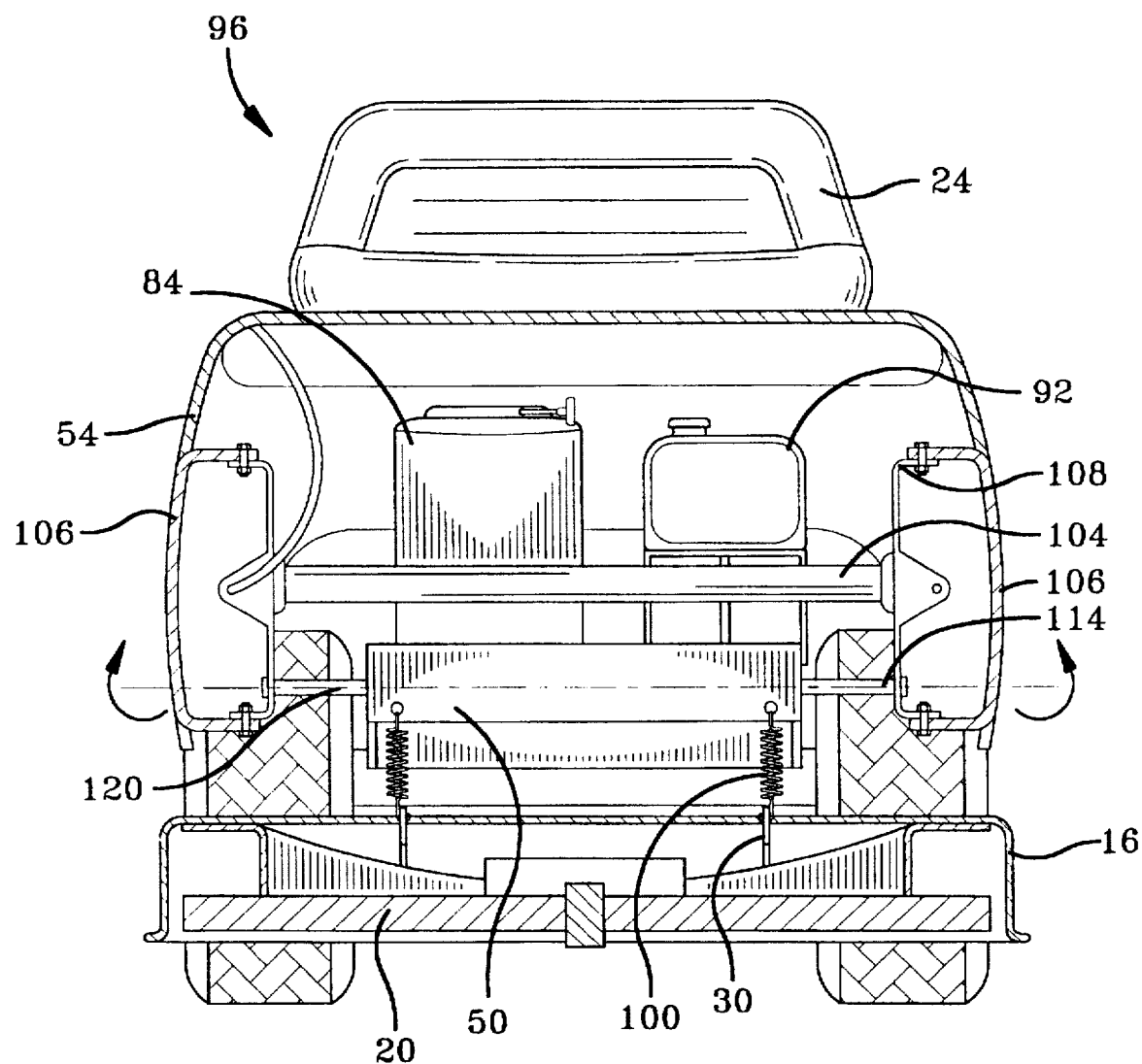
FIG. 4 is a sectional view taken through line 4—4 of FIG. 1.

Referring now to FIGS. 3 and 4, in a preferred embodiment, first frame element 50 comprises a generally planar upper surface 80 used to support engine 84, battery 88 and fuel tank 92 which are generally located near the rear portion 96 of apparatus 10. Because the engine 84 is supported by first frame member 50, an operator seating on the operator's seat 24 is also generally insulated from engine vibrations.

Depending from first frame element 50 is blade guard 16 which encircles and supports blade 20. The blade guard 16 is generally located forwardly with respect to the first frame element 50 and in a lower plane. Second spring means 100 are disposed between first frame element 50 and blade guard 16 to allow relative movement therebetween when blade height adjustment means 30 are employed.

With particular reference to FIG. 4, apparatus 10 further comprises support rod 104 disposed between opposite side walls 106 of second frame element 54. In a preferred embodiment, support rod 104 is attached at both ends to end plates 108. End plates 108 are then securely mounted to second frame element 54. The location of support rod 104 is generally used to separate the front portion 110 of apparatus 10 from rear portion 96 and is generally located as near the center of the vehicle (fore and aft) as is possible.

The suspension system, or connection means, for the apparatus 10 of the present invention further includes means for pivotally connecting the first frame element 50 to the second frame element 54. In a preferred embodiment, each of the end plates 108 is provided with a circular opening 114 to receive and pivotally support the ends of pivot rod 120. Pivot rod 120 is supported along a portion of its length by first frame element 50. In the preferred embodiment, pivot rod 120 is located beneath support rod 104 generally in the same vertical plane. In the preferred embodiment, pivot rod 120 is continuous from end to end, but it is within the scope of the present invention to provide rod portions (not shown) which extend from first frame element 50 toward opposite sides of second frame element 54. The pivot rod 120 serves to pivotally connect first frame element 50 to second frame element 54 near a forward end of first frame element while the rearward end of first frame element 50 is connected to second frame element 54 by first spring means 70.

Figure 5:
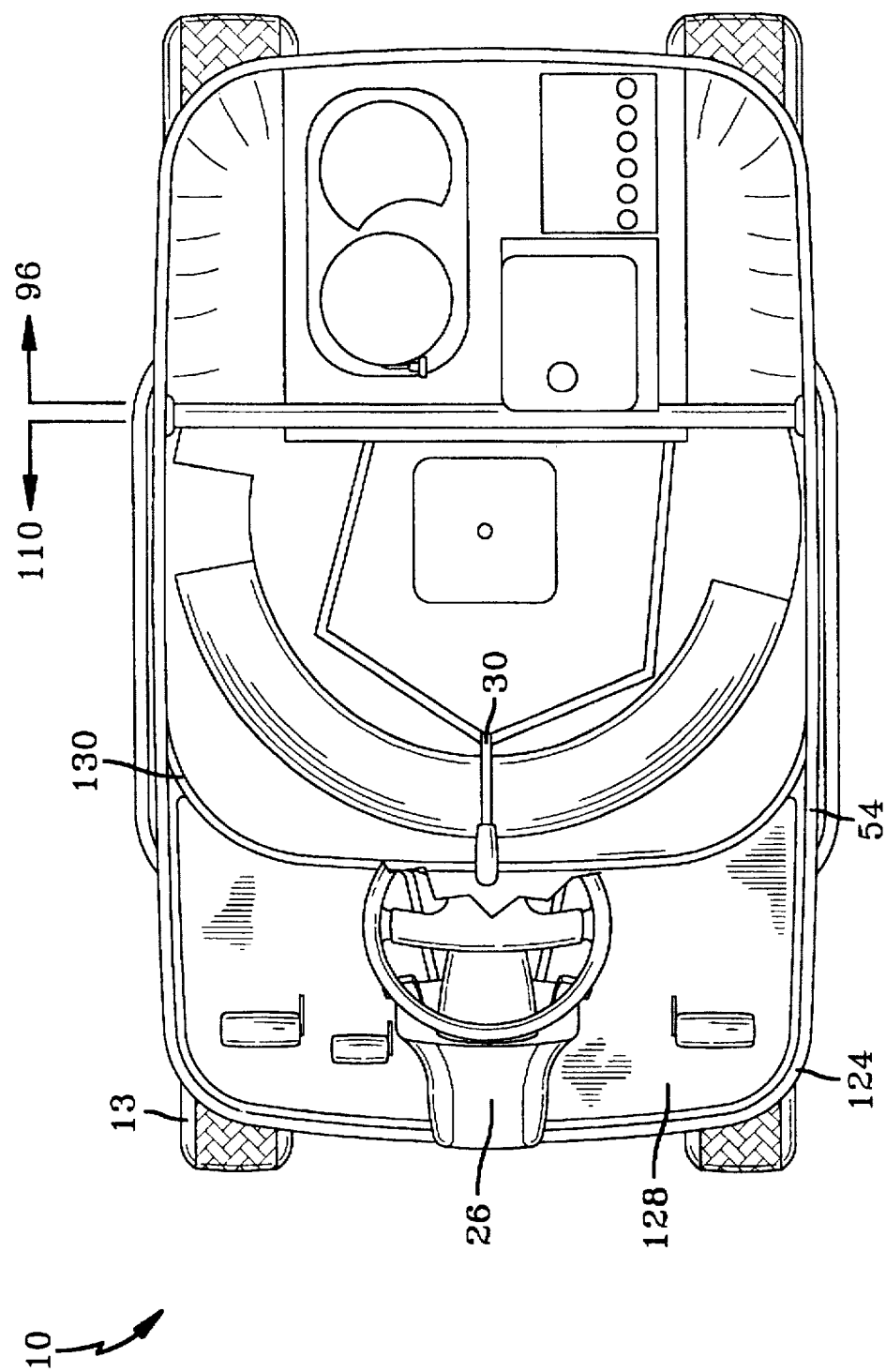
FIG. 5 is a top view of the apparatus according to the invention having the hood removed.
Figure 6:
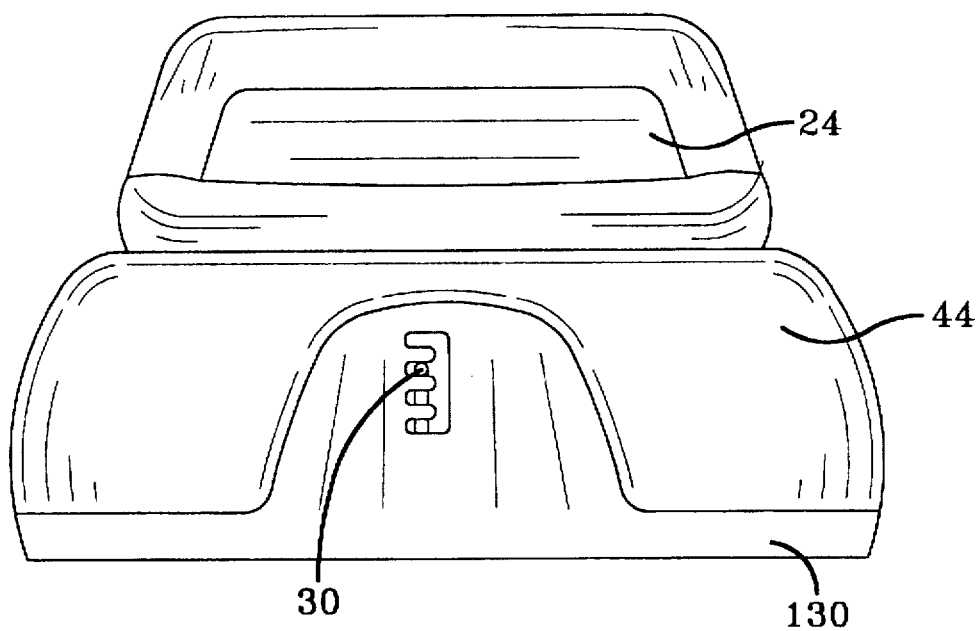
FIG. 6 is a partial front view of the apparatus according to the invention showing a supporting wall and having the hood in place.

With reference to FIGS. 5 and 6, second frame element 54 supports forward platform 124 which is generally disposed above front wheels 13 and includes foot placement areas 128 spaced on opposite sides of apparatus 10. Second frame element 54 also supports steering means 26 which is operably connected to front wheels 13. Extending upwardly from front platform 124 and spanning the width of second frame element 54 is supporting wall 130. Provided within supporting wall 130 is a notched longitudinal slot 132 for receiving and supporting the forward end of blade height adjustment means 30. As shown in FIG. 6, in a preferred embodiment, supporting wall 130 supports a forward edge of hinged hood 44.

Figure 7:
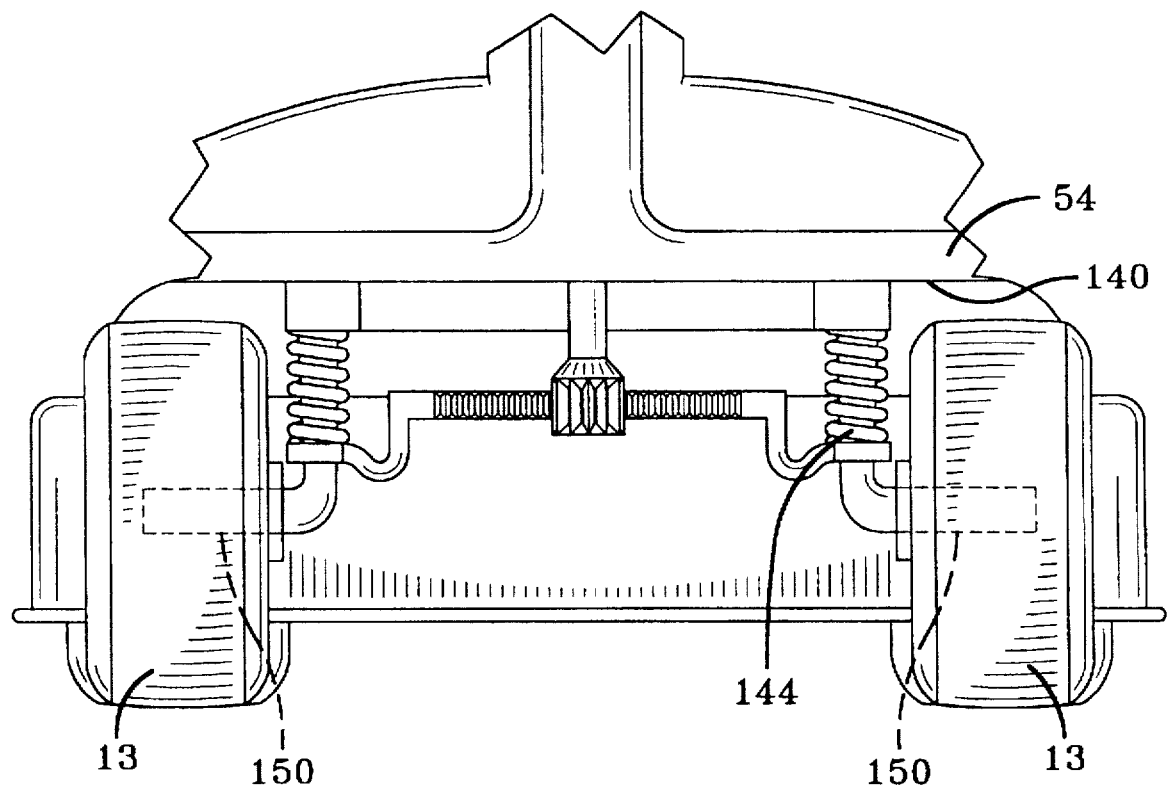
FIG. 7 is a partial front view of the apparatus showing the front wheels.

With reference to FIG. 7, the front wheels 13 are vertically spaced from and mounted to an undersurface 140 of second frame element 54 by front mounting means 144. In a preferred embodiment of the invention, each of the front wheels 13 is mounted to the undersurface 140 through its own axle 150. In one embodiment, each of the front wheels 13 is mounted in moveable relationship to undersurface 140. The embodiment includes third spring means 144 operable in the vertical space between the undersurface 140 and each axle 150 of front wheels 13.

Referring again to FIGS. 2 and 4, when the apparatus 10 is at rest, there is a predetermined rear vertical distance 154 between first frame element 50 and second frame element 54. During operation of the apparatus 10, the vertical distance 154 changes due to the pivoting action about pivot rod 120 as shown by the arrows in FIG. 4 causing movement of first spring means 70. Second frame element 54 is thereby insulated from vertical motion sustained by rear wheels 14.

With reference to FIG. 1, another important feature of the invention is the provision of left and right shift levers 202, 204 mounted on column 210. The shift levers 202, 204 are mounted on either lateral side of column 210 at a height convenient for the operator. The shift levers are connected through cables 212, 214 to the operative parts of the apparatus 10 desirably controlled by the shift levers 202, 204. For example the shift levers 202, 204 could be used to control the engine speed, ground speed, gearing, mower deck height, etc.

As shown in FIG. 8, column 210 is essentially hollow and partially houses steering means 26. Cables 212, 214 extend from shift levers 202, 204 down through column 210 and beneath front platform 124. Cables 212, 214 are supported against a sidewall 106 of second frame element 54 along a portion of their length so they extend from forward portion 110 toward rearward portion 96 of apparatus 10.

Figure 9:
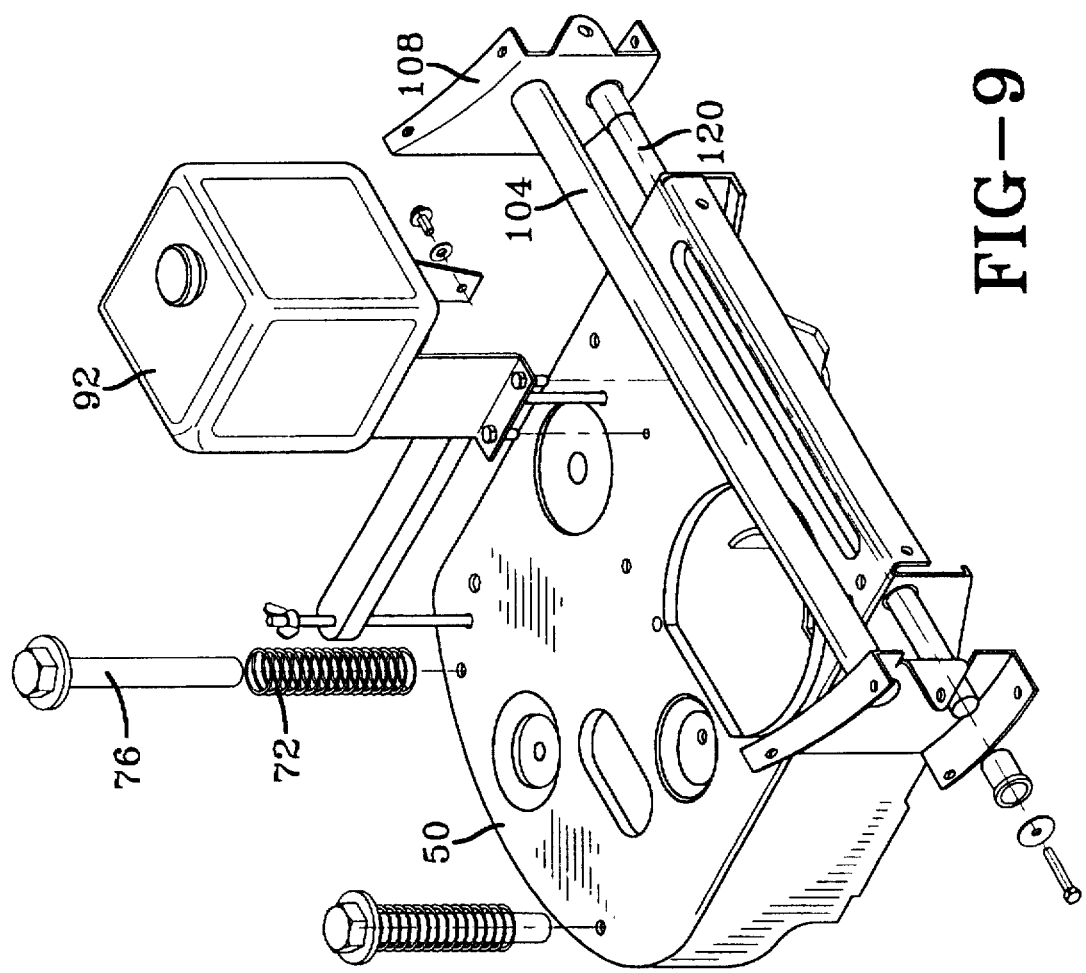
FIG. 9 is an exploded view showing a first frame element according to the invention.

FIG. 9 shows an exploded view of some of the components also shown in FIG. 3. Also shown in FIG. 9 is support rod 104 which is generally in the same vertical plane as pivot rod 120. As shown, support rod 104 is attached at both ends to end plate 108, while pivot rod 120 is pivotably attached to end plate 108.

Figure 10:
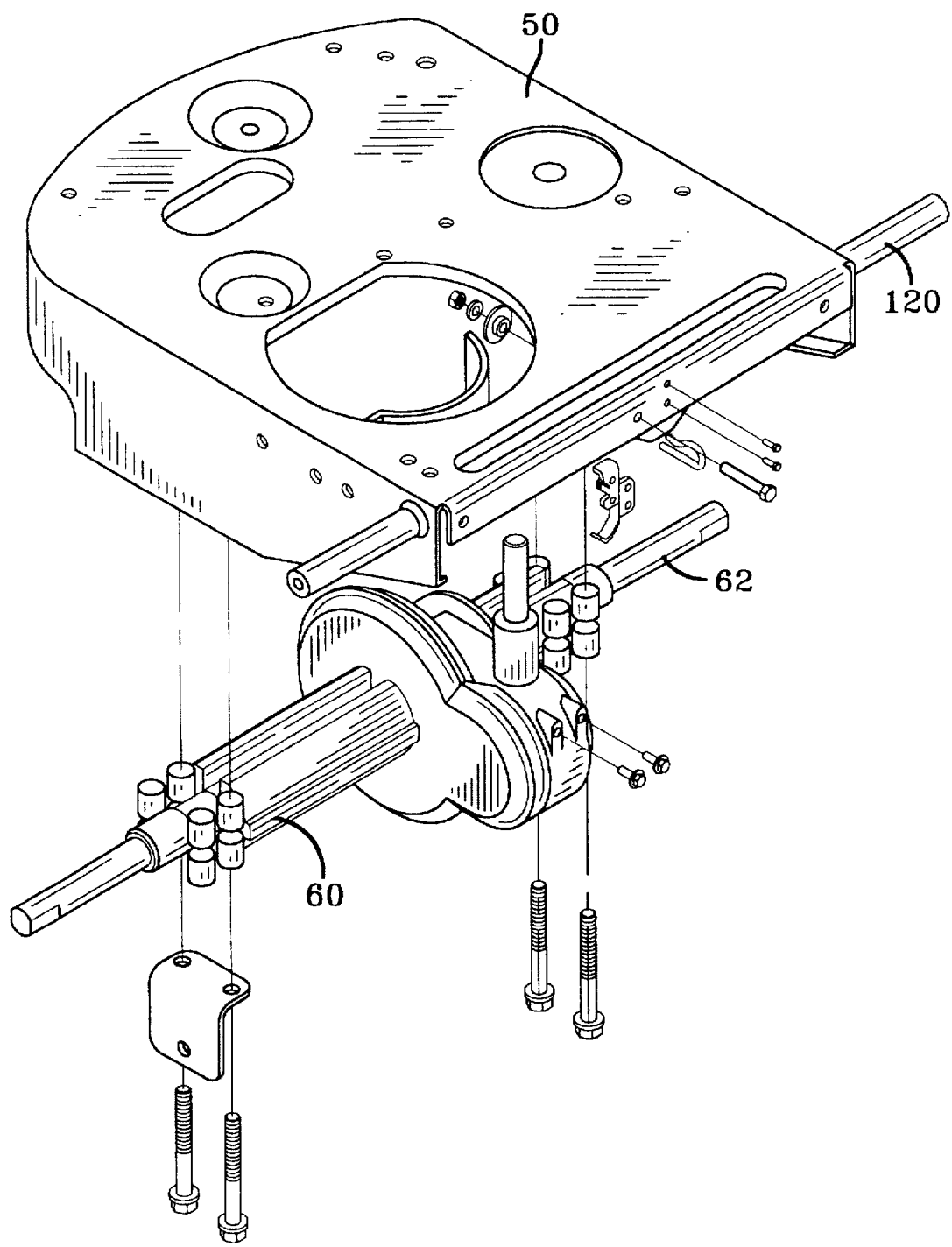
FIG. 10 is an exploded view showing mounting means for mounting the rear wheels to the first frame element according to the invention.

With reference to FIG. 10, rear mounting means 60 is positioned closer to the rearward end of first frame element 50 than pivot rod 120. Included in the rear mounting means 60 is a single axle 62 to which the rear wheels are attached.

Figure 11:
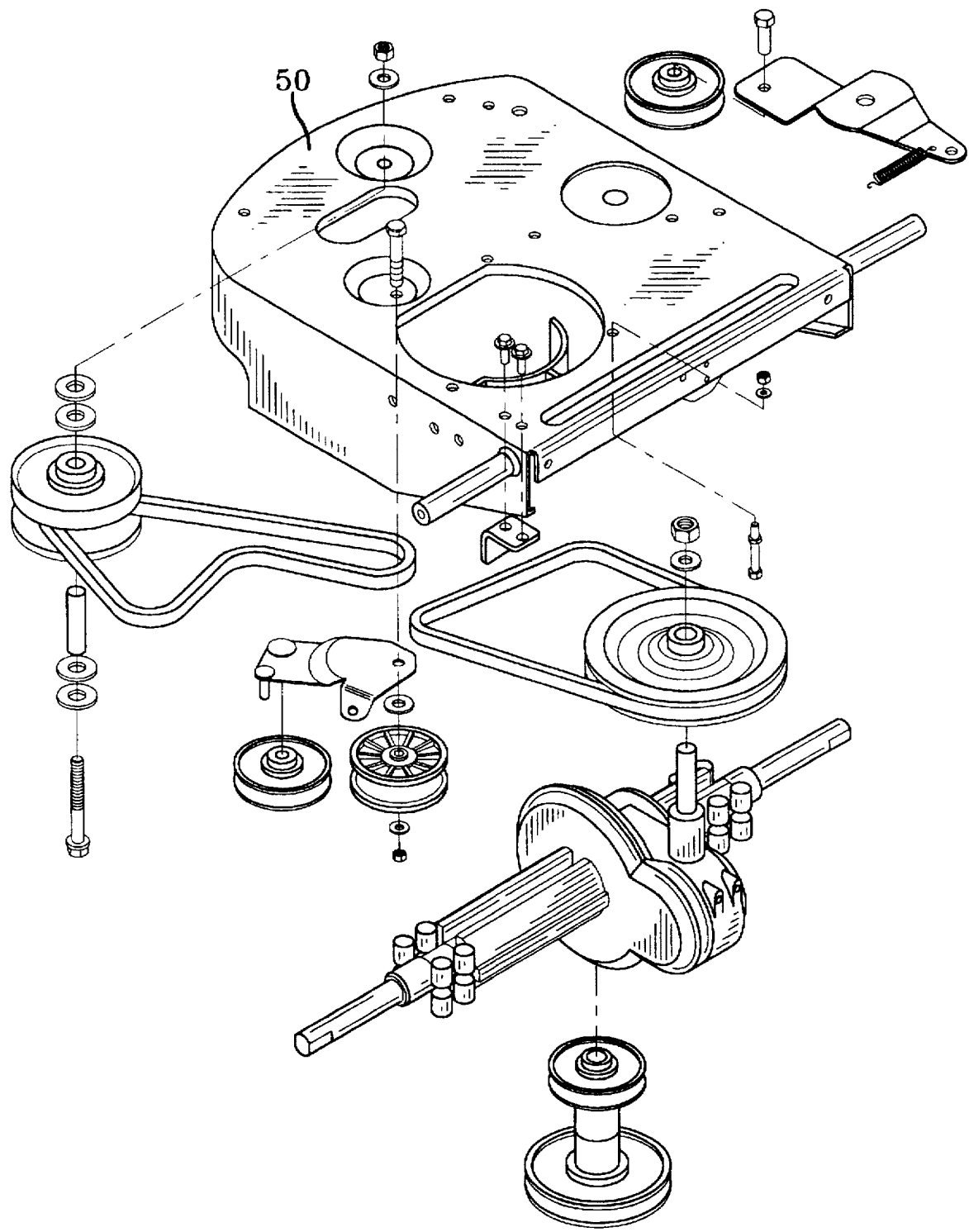
FIG. 11 is another exploded view showing the first frame element according to the invention.
Figure 12:
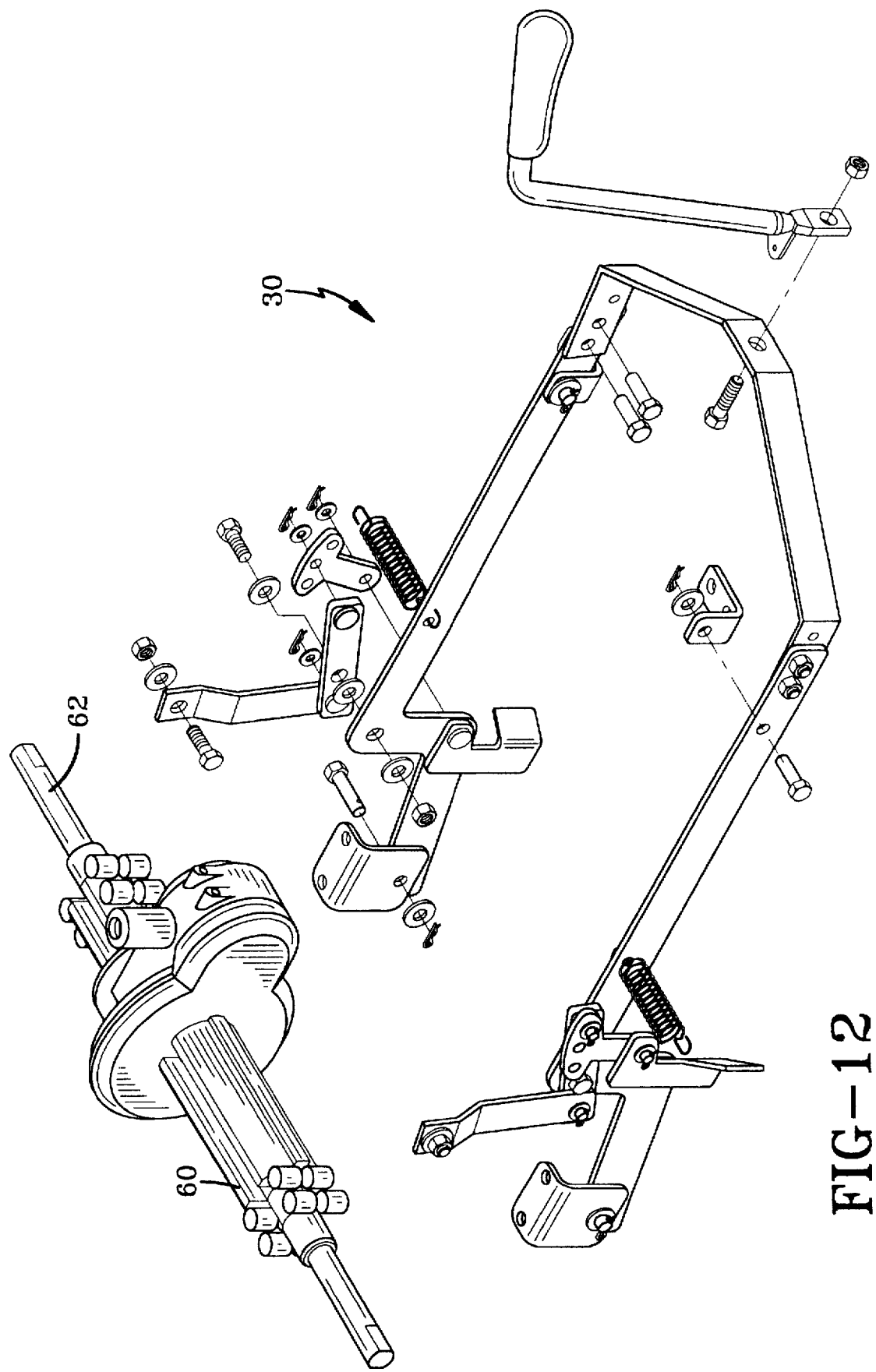
FIG. 12 is an exploded view showing blade height adjustment means according to the invention.

FIGS. 11 and 12 show the relative positioning between the first frame element 50, the rear mounting means 60, and the blade adjustment height means 30.

Figure 13:
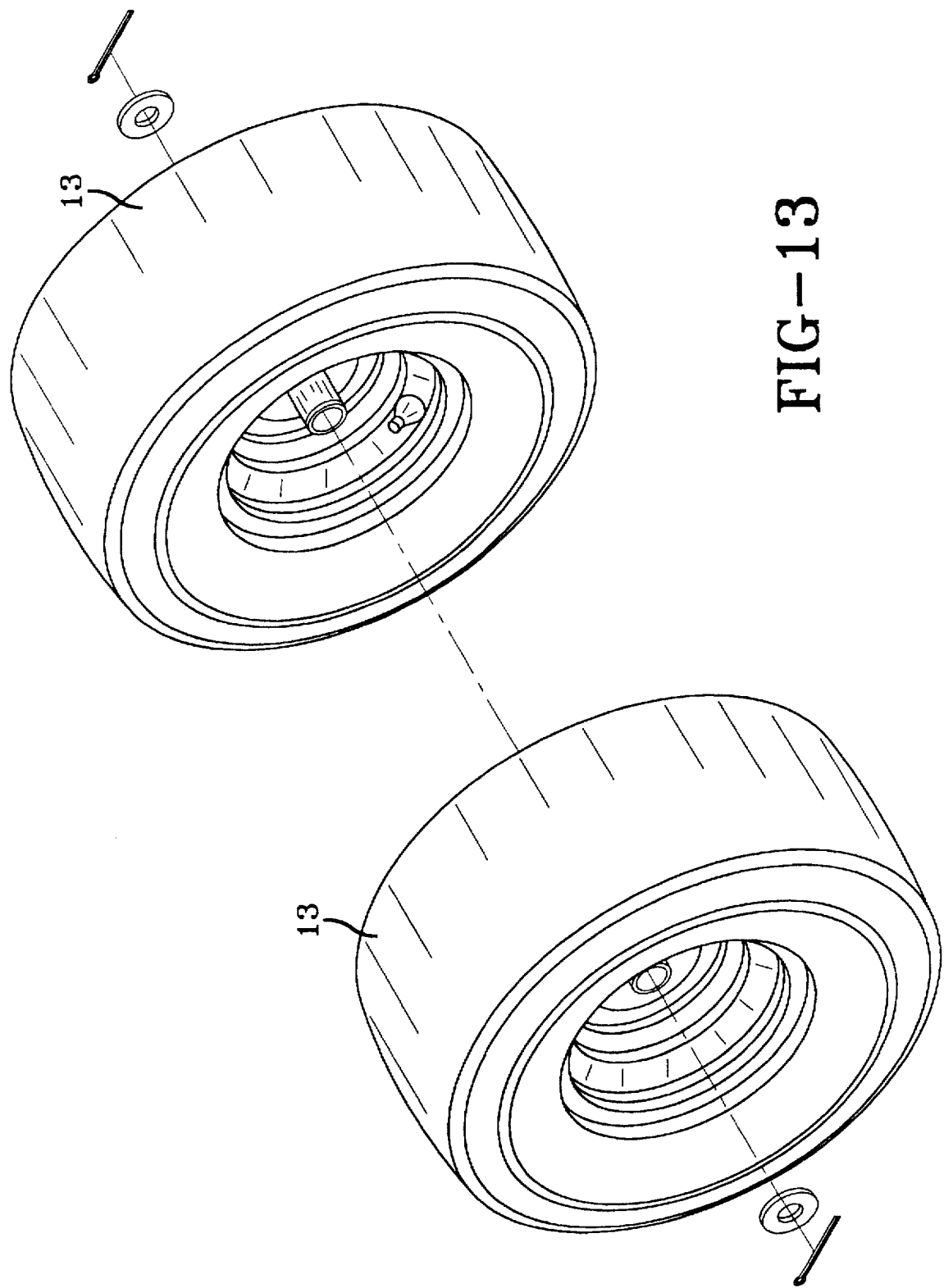
FIG. 13 is a perspective view of the front wheels of the apparatus of the present invention.

FIG. 13 shows front wheels which are mounted to apparatus by front mounting means 144.

Figure 14:
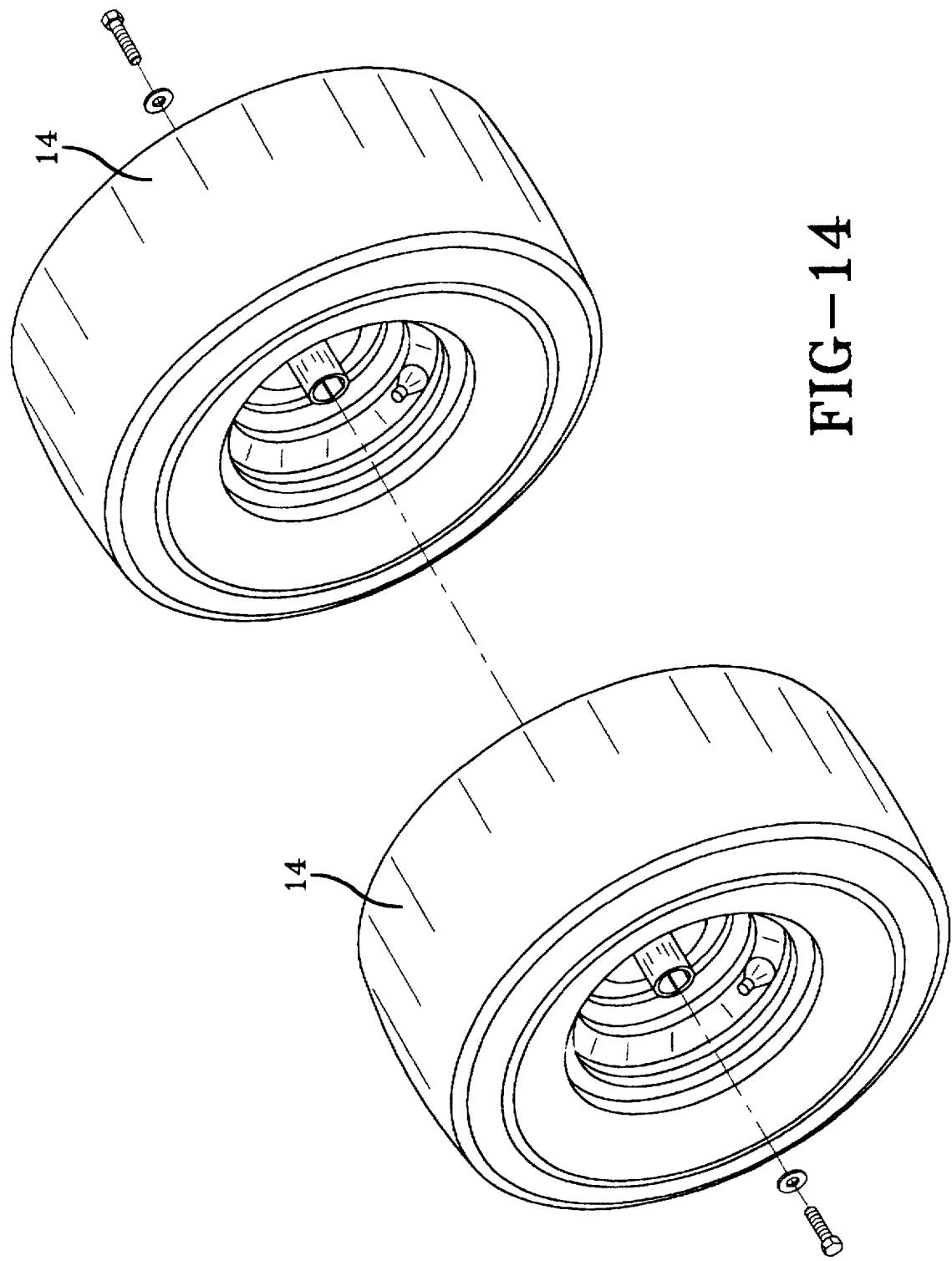
FIG. 14 is a perspective view of the rear wheels of the apparatus of the present invention.

FIG. 14 shows rear wheels 14 which are mounted at either end of shaft 62.

The preferred embodiments have been described herein above. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A grass cutting apparatus having a rotating blade acting in a generally horizontal plane, a pair of front wheels and a pair of rear wheels, and an operator's seat vertically spaced from said blade, the apparatus comprising:

a first frame element connected to the pair of rear wheels;

a second frame element;

first connecting means for pivotally connecting said first frame element to said second frame element at a forward end of said first frame element; and, first spring means vertically disposed between said first frame element and said second frame element at a rearward end of said first frame element.

2. The grass cutting apparatus of claim 1 further comprising:

a support rod extending between opposite side walls of said second frame element and being positioned generally at a lengthwise center of the apparatus.

3. The grass cutting apparatus of claim 1 wherein said first connecting means comprises:

a first end plate securely mounted to said second frame element, said end plate having a first circular opening therein;

a second end plate securely mounted to said second frame element opposite said first end plate, said second end plate having a second circular opening therein; and, a pivot rod pivotally mounted between said first end plate and said second end plate, said pivot rod having a first end and a second end, said first end being received by said first circular opening, said second end being received by said second circular opening.

4. The grass cutting apparatus of claim 1 further comprising:

a blade guard encircling said blade, said blade guard being attached to said first frame element; and, second spring means vertically disposed between said first frame element and said blade guard.

5. The grass cutting apparatus of claim 1 wherein said first spring means comprises:

a first guide rod disposed between said first frame element and said second frame element; and, a first spring disposed about said first guide rod.

6. The grass cutting apparatus of claim 5 wherein said first spring means further comprises:

a second guide rod disposed between said first frame element and said second frame element; and, a second spring disposed about said second guide rod.

7. The grass cutting apparatus of claim 1 further comprising:

mounting means for mounting said pair of front wheels to said second frame element.

8. The grass cutting apparatus of claim 7 wherein said mounting means comprises third spring means.

9. The grass cutting apparatus of claim 1 further comprising:

a column mounted to said second frame element; and, a first shift lever mounted on said column.

10. The grass cutting apparatus of claim 9 further comprising:

a second shift lever mounted on said column.

11. A grass cutting apparatus having a rotating blade acting in a generally horizontal plane and located between at least one front wheel and a pair of rear wheels, and an operator's seat vertically spaced from said blade, the apparatus comprising:

a first frame element generally positioned to the rear of the apparatus and connected to said rear wheels, said first frame element substantially supporting an engine;

a second frame element substantially supporting said operator's seat;

first connecting means for pivotally connecting said first frame member to said second frame member; and, first spring means vertically disposed between said first frame element and said second frame element.

12. The grass cutting apparatus of claim 11 further comprising:

a support rod extending between opposite side walls of said second frame element and being positioned generally at a lengthwise center of the apparatus.

13. The grass cutting apparatus of claim 11 wherein said first connecting means comprises:

a first end plate securely mounted to said second frame element, said end plate having a first circular opening therein;

a second end plate securely mounted to said second frame element opposite said first end plate, said second end plate having a second circular opening therein; and, a pivot rod pivotally mounted between said first end plate and said second end plate, said pivot rod having a first end and a second end, said first end being received by said first circular opening, said second end being received by said second circular opening.

14. The grass cutting apparatus of claim 11 further comprising:

first spring means vertically disposed between said first frame element and said second frame element.

15. The grass cutting apparatus of claim 14 wherein said first spring means comprises:

a first guide rod disposed between said first frame element and said second frame element; and, a first spring disposed about said first guide rod.

16. The grass cutting apparatus of claim 15 wherein said first spring means further comprises:

a second guide rod disposed between said first frame element and said second frame element; and, a second spring disposed about said second guide rod.

17. The grass cutting apparatus of claim 11 further comprising:

mounting means for mounting said at least one front wheel to said second frame element so that a vertical distance between said at least one front wheel and said second frame element is changeable.

18. The grass cutting apparatus of claim 17 wherein said mounting means comprises spring means being vertically positioned between said at least one front wheel and said second frame element.

19. The grass cutting apparatus of claim 11 further comprising:

a column mounted to said second frame element; and, a first shift lever mounted on said column.

20. The grass cutting apparatus of claim 19 further comprising:

a second shift lever mounted on said column.

21. A grass cutting apparatus having front and rear portions carried on front and rear wheels and having a rotating blade acting in a generally horizontal plane and located between said front and rear wheels, and an operator's seat vertically spaced from said blade, the apparatus comprising:

a first frame element being substantially located in said rear portion;

a second frame element having opposite side walls;

first connecting means for pivotably connecting said first frame element to said second frame element, said first connecting means including a pivot rod transversely extending from a forward end of said first frame element and being pivotally received at each end at said opposite side walls of said second frame element; and, first spring means vertically disposed between said first frame element and said second frame element at a rearward end of said first frame element.

22. A grass cutting apparatus having a rotating blade acting in a generally horizontal plane and located between at least one front wheel and a pair of rear wheels, and an operator's seat vertically spaced from said blade, the apparatus comprising:

a first frame element generally positioned to the rear of the apparatus and connected to said rear wheels, said first frame element substantially supporting an engine;

a second frame element substantially supporting said operator's seat;

first connecting means for pivotably connecting said first frame member to said second frame member;

a blade guard encircling said blade, said blade guard being attached to said first frame element; and, spring means vertically disposed between said first frame element and said blade guard.

\* \* \* \* \*